No. 634,082. Patented Oct. 3, 1899.
J. R. EMERY.
WIND MOTOR.
(Application filed Feb. 7, 1899.)
(No Model.) 2 Sheets—Sheet 1.
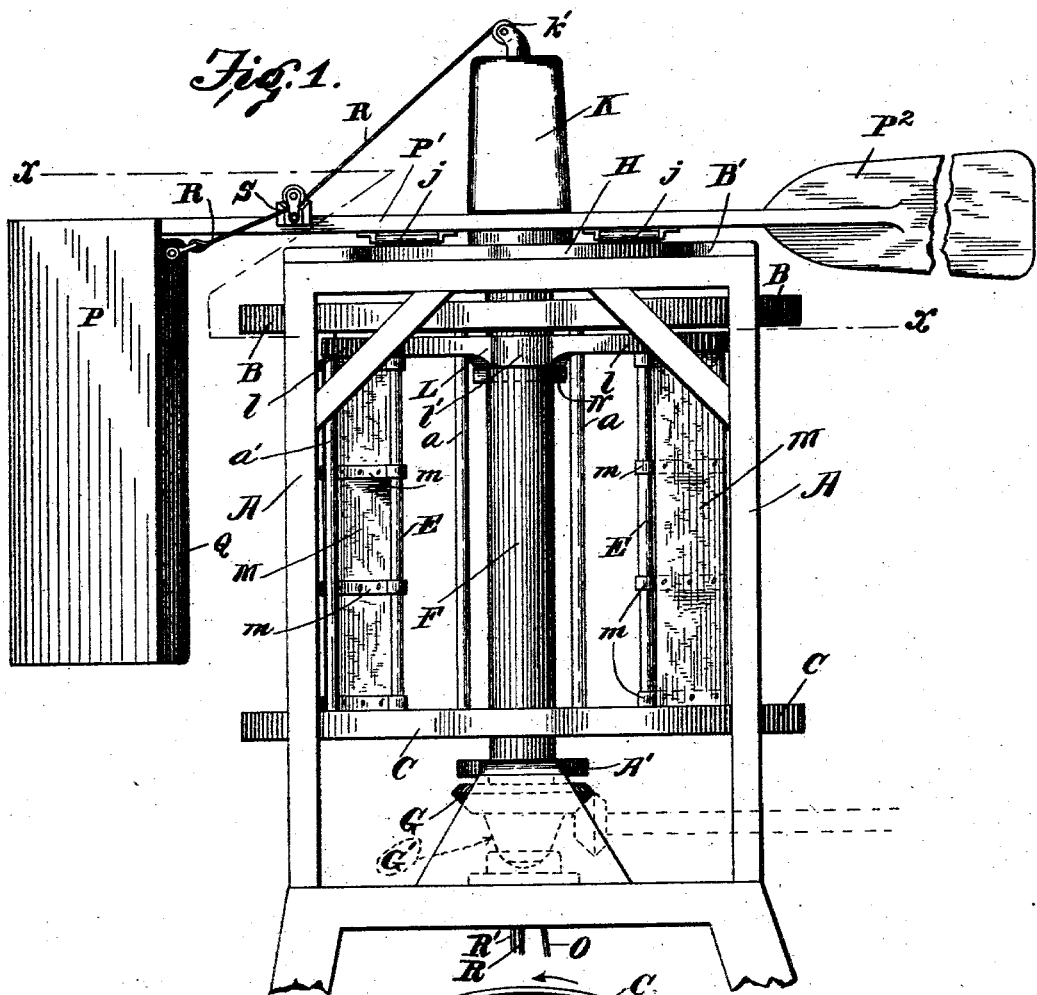
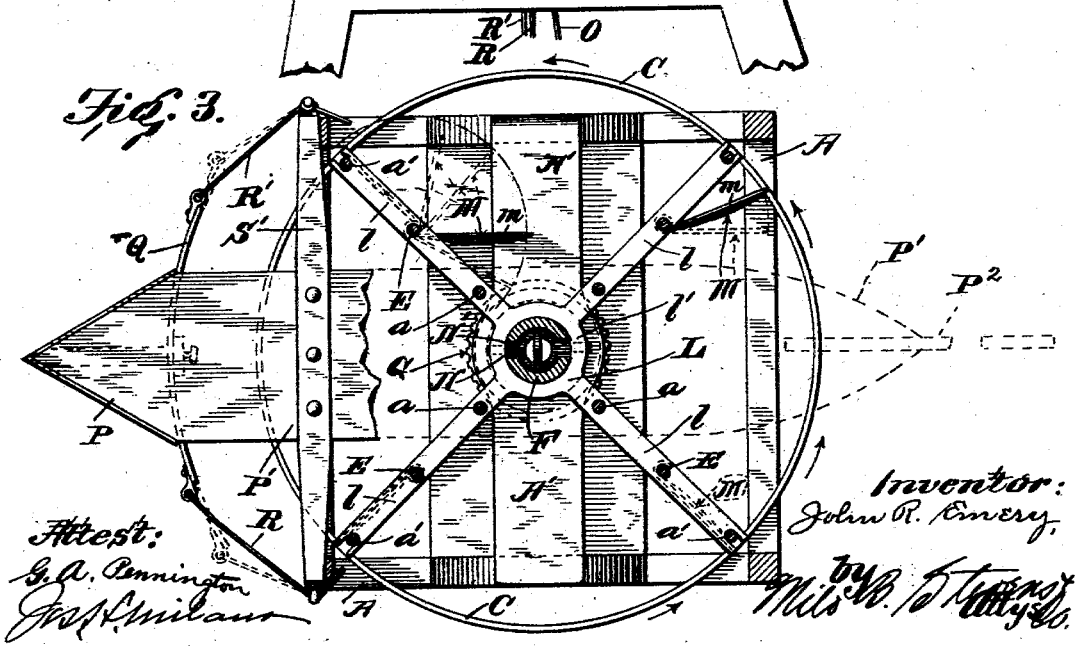
Inventor:
John R. Emery No. 634,082. Patented Oct. 3, 1899.
J. R. EMERY.
WIND MOTOR.
(Application filed Feb. 7, 1899.)
(No Model.) 2 Sheets—Sheet 2.
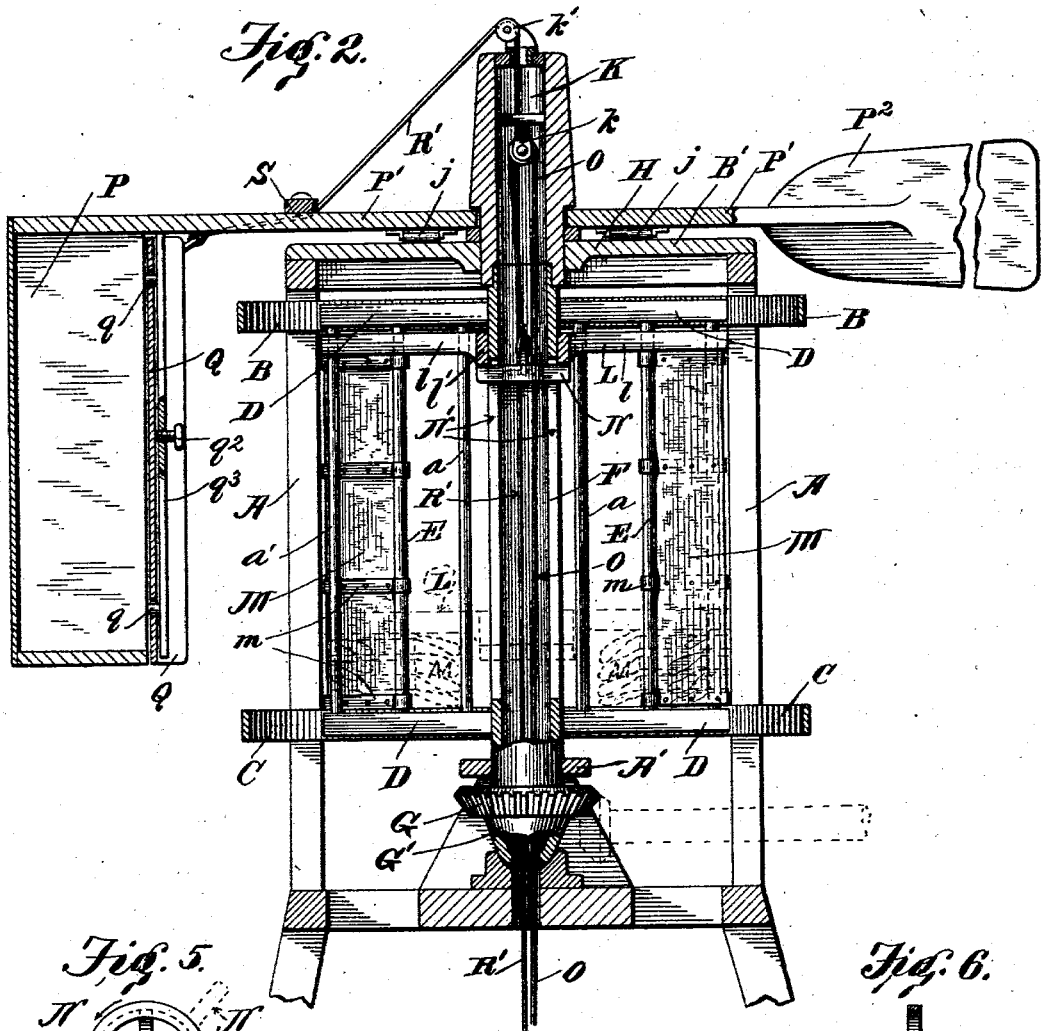
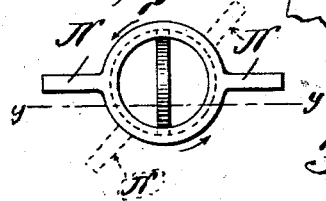
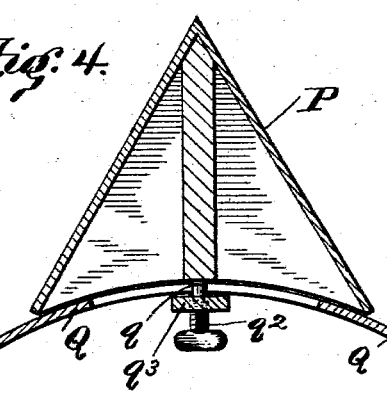

UNITED STATES PATENT OFFICE.

JOHN R. EMERY, OF OAKLEY, KANSAS.

WIND-MOTOR.

SPECIFICATION forming part of Letters Patent No. 634,082, dated October 3, 1899.

Application filed February 7, 1899. Serial No. 704,868. (No model.)

*To all whom it may concern:*

Be it known that I, JOHN R. EMERY, a citizen of the United States of America, residing at Oakley, in the county of Logan and State of Kansas, have invented certain new and useful Improvements in Horizontal Wind Wheels or Motors; and I do hereby declare the following to be a full, clear, and exact description of the invention, such as will enable others skilled in the art to which it appertains to make and use the same.

My invention relates to certain new and useful improvements in horizontal wind wheels or motors, and is designed primarily for use in propelling vehicles, although as well applicable to other forms of machinery wherein wind may be used as the motive agent.

A further object of the invention contemplates an arrangement and construction of vanes whereby they may be quickly manipulated to throw them into and out of operative position in order to start and stop the wheel.

A further object of the invention contemplates the novel arrangement and construction of the deflector used for directing the wind and regulating the force of the same upon the vanes of the wheel; and the invention also consists in the construction and combinations of parts hereinafter to be described, and specifically pointed out in the claims.

In the drawings, wherein one embodiment of the invention is illustrated in order to facilitate an understanding thereof, like letters of reference refer to corresponding parts in the several views.

Figure 1 is a side elevation of the complete construction. Fig. 2 is a vertical sectional view of the same. Fig. 3 is a sectional view upon the line $x$ $x$ of Fig. 1. Fig. 4 is a detail view of the deflector, and Figs. 5 and 6 are detail views showing the manner of attaching the lifting-lugs to the operating-rope.

Referring to the drawings, A represents the outer framework of the machine, which may be of any preferred construction, but substantially rectangular in outline.

The wheel proper comprises the upper and lower circular rims B and C, properly braced and spaced apart by the spokes D and the rods E. These spokes may be of any desired number, but for simplicity in illustration I have shown but four. The spokes are secured at their outer ends to the rims B and C and at their inner ends to a hollow vertical shaft F. The shaft F is the medium through which power is transmitted from the motor to the vehicle or other machinery desired to be operated by the motor, and as one means of suitable connection with such machinery I have shown at the lower end of this shaft a cog-wheel G, directly below which is a cone-shaped projection G', adapted to rest in any suitable bearing provided for the purpose. The shaft passes through and is supported by the cross-bar A' at its lower end and at its upper end fits into an annular recess B' in the dome, to be hereinafter described. Upon the upper portion of the framework is a circular plate H, upon the surface of which the connecting-bar P' between the deflector and its wing is adapted to revolve upon roller-bearings $j$.

K designates a hollow dome, the opening in which registers with the opening of the hollow shaft F, which dome is rigidly secured to the plate H and held in place thereby.

Equidistant apart and passing from the lower to the upper spokes of the wheel are guide-rods $a$ $a'$, and adapted to slide up and down on these guide-rods and the rods E is a lifting device L, comprising the sleeve $l'$, surrounding the hollow shaft before referred to, and the radial arms $l''$, corresponding in number to and occupying a position directly under the spokes of the wheel. The arms are provided with vertical apertures and are adapted to loosely engage the guide and connecting rods in the wheel, as best seen in Fig. 3.

The vanes are represented at M and are in number corresponding also to the number of spokes. These vanes are formed of any suitable flexible material properly strengthened by binding at the edges or otherwise and are pivoted through the means of metallic clips to the rods E of the wheel, the top clips being pivotally secured also to the arms of the lifting device. The vanes are kept from rolling by the metallic pieces $m$, which pieces also serve as the metallic clips just mentioned, and are adapted to slide up and down upon the rods E when the wings are to be collapsed, as hereinafter described. In order to raise and hold the lifting device in elevated position, I provide the lugs N, adapted to work in slots N' in the hollow shaft upon the under surface of the sleeve portion of the lifting device. These lugs are formed upon a metallic bar, which is secured to one end of a rope, chain, or other flexible member O. The rope in turn passes upward through the hollow shaft and dome, over a pulley $k$ at the upper end of the dome, and thence downward through the shaft to one side of the metallic bar carrying the lugs and out at the extreme lower end below the gear-wheel, from whence it is carried to an operating ratchet-wheel or other holding mechanism within easy reach of the operator of the machine to which the invention is applied.

From so much of the description the operation of the wheel portion of the invention may be understood as follows: With the lifting device elevated and the vanes open, as shown in Fig. 1, the wheel will revolve in the usual manner—that is, the wind acting on one side of the machine will lay the vanes on that side flat against the rods $a'$, where they are held exposed to the full power of the wind, and on proceeding further the vanes are taken aback and swing around so as to feather or present their edges to the wind until they again come into the first-mentioned position. Now when it is desired to stop the running of the wheel all that is necessary to be done is for the operator to release the rope or chain O and thereby permit the holding-lugs N to drop to the lowermost portion of the slot in the shaft, and the weight of the lifting device will immediately drop down upon the lower rim of the wheel, as shown in dotted lines in Fig. 1, carrying with it and collapsing the vanes, as also shown in dotted lines. Consequently, there being no further resistance whatsoever to the wind, the wheel will cease to rotate. It will be obvious that when it is desired to reset the vanes in operative position it is merely necessary to pull upon the rope or chain and the lifting device will be elevated and the vanes stretched to their full extent, as also shown in Fig. 1.

Another feature of my invention may now be described, and it relates to the peculiar construction of the deflector for directing the wind in a regulated manner upon the vanes of the wheel. As hereinbefore stated, this portion of the mechanism comprises a deflector P, the connecting-bar P', and the wing $P^2$, the whole being adapted to revolve through the medium of the roller-bearings $j$ upon the circular plate H, secured on the top of the framework A. The deflector proper is V-shaped in cross-section and projects downwardly from one end of the connecting-bar to nearly the entire extent of the vanes of the wheel. The wind will act upon the wing $P^2$ and turn the same to a position where the deflector directly faces the wind. Now it will be understood that the wheel is of course revolved to a greater or less extent according to the force of the wind acting upon the same, and it is to regulate this force upon the vanes that the deflector is provided. Directly in rear of the deflector is a sheet-metal plate Q of a width somewhat greater than the width of the deflector at its greatest diameter, the plate being secured to the same by means of a slot-and-pin connection $q$, so as to be slidable laterally in either direction. In order that this plate may not be moved too easily and will be held in its adjusted position, I provide the tension-screw $q^2$, passing through the bar $q^3$ and bearing upon the surface of the plate. For drawing the plate outward in the direction desired I provide the operating-cords R and R', which are respectively fastened to the opposite edges of the plate and pass upwardly under pulleys mounted at the ends of the arms S S', projecting outwardly at right angles from the connecting-bar P' and thence upwardly over another pulley $k'$ at the upper portion of the dome and finally downward through the dome and hollow shaft and out at the lower end of the same, whence it is carried to a position within easy reach of the operator and held in a manner similar to that suggested for the rope O. It will thus be seen that according as the rope R or R' is drawn upon the corresponding side of the plate to which the cord is attached will be drawn out to the position shown by dotted lines in Fig. 4. Should the wind be mild, the plate will be held in its normal or central position; but should the wind become stronger and it be consequently desired to decrease the exposed surface of the wheel upon which the wind operates all that is necessary is to pull out the plate in the direction desired and deflect the wind to a more or less extent outwardly away from the vanes.

While I have shown a particular construction for carrying my objects into effect, I desire it understood that the same is for the mere sake of illustration and that many changes and alterations in the details of construction and operation may readily be made or suggested without departing from the nature and principle of the invention.

If found desirable, any suitable governor may be applied to my machine for facilitating the steady running thereof; but as such constitutes no part of my present invention I have not illustrated or described the same.

Having thus described the invention, what is claimed as new, and desired to be secured by Letters Patent, is—

1. In a wind wheel or motor, the combination with a rotary member, of a hollow shaft therefor, flexible collapsible vanes mounted in said member, a lifting device for raising the vanes into operative position, and means working in the hollow shaft adapted to control the rise and fall of the lifting device, comprising operating-ropes and projecting pieces carried thereby adapted to engage the under surface of the lifting device, substantially as described.

2. In a wind wheel or motor, the combination with a rotary member, of a hollow slotted shaft therefor, flexible collapsible vanes mounted in said member, a lifting device for raising the vanes into operative position comprising a sleeve slidable on the shaft and radial arms suitably connected to the vanes, and means for controlling the rise and fall of the lifting device comprising the projecting fingers or lugs bearing on the under surface of the sleeve and guided by the slots in the hollow shaft and a rope or chain connected to and adapted to raise and drop said fingers or lugs, substantially as described.

3. In a wind wheel or motor, the combination with a rotary member, of a hollow slotted shaft therefor, a hollow dome, flexible collapsible vanes mounted in said member, a lifting device for raising said vanes into operative position and means for controlling the rise and fall of said lifting device comprising the lugs or fingers projecting from and guided by the slots in the hollow shaft and a rope or chain adapted to raise and drop said fingers or lugs passing upward through the hollow shaft over a pulley mounted in the dome and thence outward at the lower end of said shaft, substantially as described.

4. In a wind wheel or motor, the combination with a rotary member, of a wind-deflector therefor substantially V-shaped in cross-section, a plate slidably mounted on the rear thereof and means for laterally moving said plate in either direction, and a wing rigidly secured to the deflector for controlling the movement of the deflector, substantially as described.

5. In a wind wheel or motor, the combination with a rotary member, of a wind-deflector therefor substantially V-shaped in cross-section, a plate slidably mounted upon and in the rear of said deflector, means for laterally moving the plate in either direction, a tension device for said plate, and a wing for controlling the movement of the deflector, substantially as described.

6. In a wind wheel or motor, the combination with a rotary member, of a wind-deflector therefor, a wing and a connecting-bar for revolubly mounting the deflector and wing upon a machine, a plate secured to the deflector and slidable thereon and means for laterally moving said plate in either direction, substantially as described.

7. In a wind wheel or motor, the combination with a rotary member, and a hollow shaft therefor, of a wind-deflector, a wing, and a connecting-bar for revolubly mounting the deflector and wing upon the machine, arms projecting outwardly from the connecting-bar near its forward end, pulleys mounted in said arms, a plate slidably mounted upon the rear of the deflector and means for laterally moving said plate in either direction comprising ropes or cords connected to the respective sides of said plate passing upward over the pulleys in the arms of the connecting-bar and thence downward and outward through the hollow shaft, substantially as described.

8. In a wind wheel or motor, the combination with a rotary member, of a wind-deflector therefor, a wing, and a connecting-bar for revolubly mounting the same upon the machine, a slotted plate mounted on pins in the rear of the deflector and movable laterally thereof, and means for operating said plate, substantially as described.

9. In a wind wheel or motor, the combination with a rotary member, of a wind-deflector therefor, a wing, a connecting-bar for the two revolubly mounted on the machine, a plate slidably mounted in the rear of the deflector, means for laterally moving the plate in either direction, and a tension device for the plate, substantially as described.

In testimony whereof I affix my signature in presence of two witnesses.

JOHN R. EMERY.

Witnesses:
JOHN ANDERSON,
H. C. DOERING.